*(12)* United States Patent
Kimelman et al.

(10) Patent No.: US 7,607,133 B2
(45) Date of Patent: Oct. 20, 2009

(54) INTERRUPT PROCESSING CONTROL

(75) Inventors: Paul Kimelman, Alamo, CA (US); Ian Field, Walnut Creek, CA (US)

(73) Assignee: ARM Limited, Cambridge (GB)

( * ) Notice: Subject to any disclaimer, the term of this patent is extended or adjusted under 35 U.S.C. 154(b) by 918 days.

(21) Appl. No.: 10/775,335

(22) Filed: Feb. 11, 2004

(65) Prior Publication Data

US 2005/0177666 A1    Aug. 11, 2005

(51) Int. Cl.
*G06F 9/46* (2006.01)
*G06F 9/44* (2006.01)
*G06F 3/00* (2006.01)
*G06F 13/24* (2006.01)
*G06F 13/26* (2006.01)

(52) U.S. Cl. .................. 718/103; 718/100; 718/102; 712/233; 712/244; 710/48; 710/260; 710/263; 710/264; 710/266

(58) Field of Classification Search ................ 718/104, 718/1, 100, 101, 102, 103, 106, 107, 108; 710/48, 49, 50, 260, 263, 264, 266, 268, 710/262, 265; 712/244, 233, 224
See application file for complete search history.

(56) References Cited

U.S. PATENT DOCUMENTS

| | | | | |
|---|---|---|---|---|
| 4,488,227 A | * | 12/1984 | Miu et al. | 712/244 |
| 4,636,944 A | * | 1/1987 | Hodge | 710/264 |
| 4,792,890 A | | 12/1988 | Blair et al. | |
| 5,161,226 A | * | 11/1992 | Wainer | 710/264 |
| 5,237,692 A | * | 8/1993 | Raasch et al. | 710/267 |
| 5,410,715 A | * | 4/1995 | Ishimoto et al. | 710/264 |
| 5,481,725 A | * | 1/1996 | Jayakumar et al. | 710/48 |
| 5,535,009 A | | 7/1996 | Hansen | |
| 5,613,128 A | * | 3/1997 | Nizar et al. | 710/266 |
| 5,706,491 A | * | 1/1998 | McMahan | 712/234 |
| 5,822,595 A | * | 10/1998 | Hu | 710/264 |
| 5,987,537 A | | 11/1999 | Brainard et al. | |
| 6,081,867 A | * | 6/2000 | Cox | 710/264 |
| 6,108,744 A | * | 8/2000 | Lebee | 710/266 |
| 6,807,595 B2 | * | 10/2004 | Khan et al. | 710/260 |
| 7,120,718 B2 | * | 10/2006 | Pezzini | 710/265 |
| 2003/0065855 A1 | | 4/2003 | Webster | |

FOREIGN PATENT DOCUMENTS

| | | |
|---|---|---|
| GB | 1 108 801 | 4/1968 |
| JP | 6-66051 | 8/1994 |

OTHER PUBLICATIONS

Japanese Official Action mailed Dec. 9, 2008 in corresponding Japanese Application No. 2004-367705, pp. 1-4.*

* cited by examiner

*Primary Examiner*—Van H Nguyen
*Assistant Examiner*—Abdullah Al Kawsar
(74) *Attorney, Agent, or Firm*—Nixon & Vanderhye P.C.

(57) ABSTRACT

A data processing system 2 supporting interrupt handling is provided with an interrupt controller 24. The interrupt controller is responsive to save state data when interrupt processing is commenced by pre-emption of existing processing, whether that be background processing or another interrupt. If a further interrupt is required to be executed immediately after the interrupt which triggered the pre-emption, then the speed with which interrupt processing can be started is advantageously increased if that subsequent interrupt processing is performed without restoring and then resaving the original state data. The interrupts in this arrangement can be considered to be chained together without intervening save and restore operations.

24 Claims, 9 Drawing Sheets

INTERRUPT PROCESSING CONTROL

BACKGROUND OF THE INVENTION

1. Field of the Invention

This invention relates to the field of data processing systems. More particularly, this invention relates to the field of interrupt processing control within data processing systems.

2. Description of the Prior Art

It is known to provide data processing systems with the ability to respond to interrupt signals to initiate processing of interrupt handling programs. Such behaviour is common and highly useful within embedded and deeply embedded systems in which it is desired to perform real time or near real time processing. It is often the case that such systems are interrupt driven with most of the useful processing activities taking place in response to stimuli associated with differing interrupt signals.

Within many data processing systems with interrupt handling facilities, an important performance parameter is how quickly after receiving an interrupt signal the system can start to execute code for dealing with that interrupt signal. As an example, within a data processing system controlling an antilock braking system an interrupt signal may indicate detection of a skid condition and accordingly it is highly important that the data processing system should respond to this skid indication as rapidly as possible and take the appropriate corrective action.

When responding an interrupt signal, it is normal that the system will save data corresponding to the current state/context of the system representing the current processing being performed with this state/context being restored and that processing is restarted once the interrupt handling program that is to be triggered has completed its execution. The time taken to save this state/context data can be a significant factor in limiting the speed with which the system can respond to the occurrence of an interrupt event. When the interrupts may be nested (i.e. a higher priority interrupt may pre-empt an existing active interrupt of a lower priority), this creates additional issues since it is not possible to use a single store location, such as banked registers, to hold the state/context since many nested levels of such data may need to be held.

SUMMARY OF THE INVENTION

Viewed from one aspect the present invention provides an apparatus for processing data, said apparatus comprising:

processing logic operable to perform processing operations under control of program instructions; and an interrupt controller operable:

in response to a first interrupt event, to save to a stack data store first state data associated with processing being performed when said first interrupt event occurred and to redirect program instruction execution to a first interrupt handling program;

upon completion of said first interrupt handling program, to detect if one or more second interrupt events having a higher priority than said processing that was interrupted by said first interrupt event has occurred during execution of said first interrupt handling program and:

(i) if such a said one or more second interrupt events has occurred, then to redirect program instruction execution to a second interrupt handling program without saving further state data to said stack data store; and (ii) if such a said one or more second interrupt event has not occurred, then to reload said first state data from said stack data store and to resume said processing that was interrupted by said first interrupt event.

The present technique recognises that when the system is already processing a first interrupt, should a further interrupt arise then when the processing of the first interrupt has completed, there is no need to restore the state/context of the system prior to that first interrupt rather the system can immediately proceed to processing the second interrupt. When the second interrupt has completed processing, the state/context data which requires restoring is that which was present before the first interrupt started execution and accordingly this state/context data is available. Avoiding the need to restore and subsequently save again the original state/context data when moving directly from the processing of one interrupt to the processing of the next interrupt produces a significant increase in the speed with which the system is able to respond to interrupts. Moreover, this advantage of avoiding unnecessary restoring and saving of state/context takes place when interrupts are being processed back-to-back and thus in circumstances of high interrupt load which corresponds to the situation in which it is desired to have the most efficient operation. The processing of the interrupts in such a situation can be considered to be chained together without the need for intervening restoration and saving of the original state/context data which was present prior to the interrupt processing starting.

It will be appreciated that the state data which is stored can take a variety of different forms but will typically include one or more of a program counter value, a processor status register value and the contents of one or more data processing registers. In addition the need for the interrupt handling software to save and restore any other registers will also be avoided yielding a further decrease in processing overhead.

It will be appreciated that some interrupt handling systems may support nested interrupts in which a high priority interrupt can pre-empt the existing background process or pre-empt a currently active interrupt of a lower priority. In such nested systems, several active interrupt handling programs may be nested together with the highest priority such program executing at the top level and the respective lower priority active interrupt handling programs, which have been pre-empted, being restarted in turn in due course.

The ability of an interrupt event to result in pre-emption of an existing interrupt which is being processed is advantageously controlled by a system employing respective priority values associated with each interrupt. These priority values can form a hierarchy and be used to control whether a particular interrupt event will result in pre-emption of other currently active interrupts.

The priority values may be hardwired to their associated interrupts but are advantageously programmable values. Programmability of these values lends considerable flexibility to the interrupt handling system.

The recognition of the advantage associated with avoiding inappropriate restoration and resaving of state/context data can be extended further by provision of a late interrupt signal which is active during reloading of state data and which serves to abort that return. Until the return is actually committed, it is possible to abort its partial completion so as to service a newly and late arriving interrupt since the state data for restoration will still be available to be reloaded when that late arriving interrupt has been serviced.

It will be appreciated that at a basic level when switching directly from handling of one interrupt to handling of a next interrupt, an advantage may be achieved merely by avoiding the need to save state data upon that switch. In preferred embodiments, a further advantage may be achieved by also avoiding the reloading of state data upon such a switch since that state data is not to be used as the next interrupt will not assume that state data.

In systems within which a late arriving interrupt can trigger an abort of a return to a previous state/context, preferred embodiments of the invention are operable to undo any alterations made by the partially completed return within the data stored in the stack data store.

It will be appreciated that the transfer of data values to the stack data store and the control of program instruction fetching associated with the interrupt handling program could take place serially. However, in preferred embodiments the transfer of data values to the stack data store can be performed in parallel with loading required program instructions into an instruction pipeline of the system prior to execution. This split of the data and instruction management also fits well with the late arriving interrupt feature in that whilst state/context data is being saved it is possible for what was initially intended to be the interrupt processing that should be performed to be superseded by a different later and high priority interrupt which instead has its program instruction code loaded into the instruction pipeline. Either of these interrupts will require the same previous state data to be saved and accordingly the transfer of data into the stack is not effected by the change in the data being loaded into the pipeline. The late arriving interrupt mechanism has advantages both during normal pre-emption and tail chaining operation. In all cases it is advantageous to take the highest priority pending interrupt as it avoids a further pre-emption of the new interrupt and the tail chaining feature will mean that the interrupt being held off by the late arrival will be efficiently switched to when processing of the late arrival has finished.

The system is further improved by providing that the interrupt controller is responsive to execution of a return instruction with a predetermined link address value to trigger a return from interrupt operation. Having the interrupt controller triggered to perform the hardware based return from interrupt operations in response to such a specific address fits well with avoiding the need for the interrupt handling program to carry additional instruction overhead associated with entry to and exit from interrupt processing as well as making such code more generic in its applicability. Furthermore, with an interrupt-only application (one that only responds), the final return can trigger entry into a lower power "Sleep " mode waiting for the next interrupt event. This final return need does not restore and so the next interrupt can "clain " on without the need for a save operation.

It will be appreciated that the stack data store could take a variety of different forms, such as special purpose registers, but is preferably a stack memory region within a general purpose memory.

Viewed from another aspect the present invention provides a method of processing data, said method comprising the steps of:

performing processing operations under control of program instructions; and in response to a first interrupt event, saving to a stack data store first state data associated with processing being performed when said first interrupt event occurred and to redirect program instruction execution to a first interrupt handling program; wherein upon completion of said first interrupt handling program, detecting if a second interrupt event having a higher priority than said processing that was interrupted by said first interrupt event has occurred during execution of said first interrupt handling program and:

(i) if such a said second interrupt event has occurred, then redirecting program instruction execution to a second interrupt handling program without saving further state data to said stack data store; and (ii) if such a said second interrupt event has not occurred, then reloading said first state data from said stack data store and resuming said processing that was interrupted by said first interrupt event.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
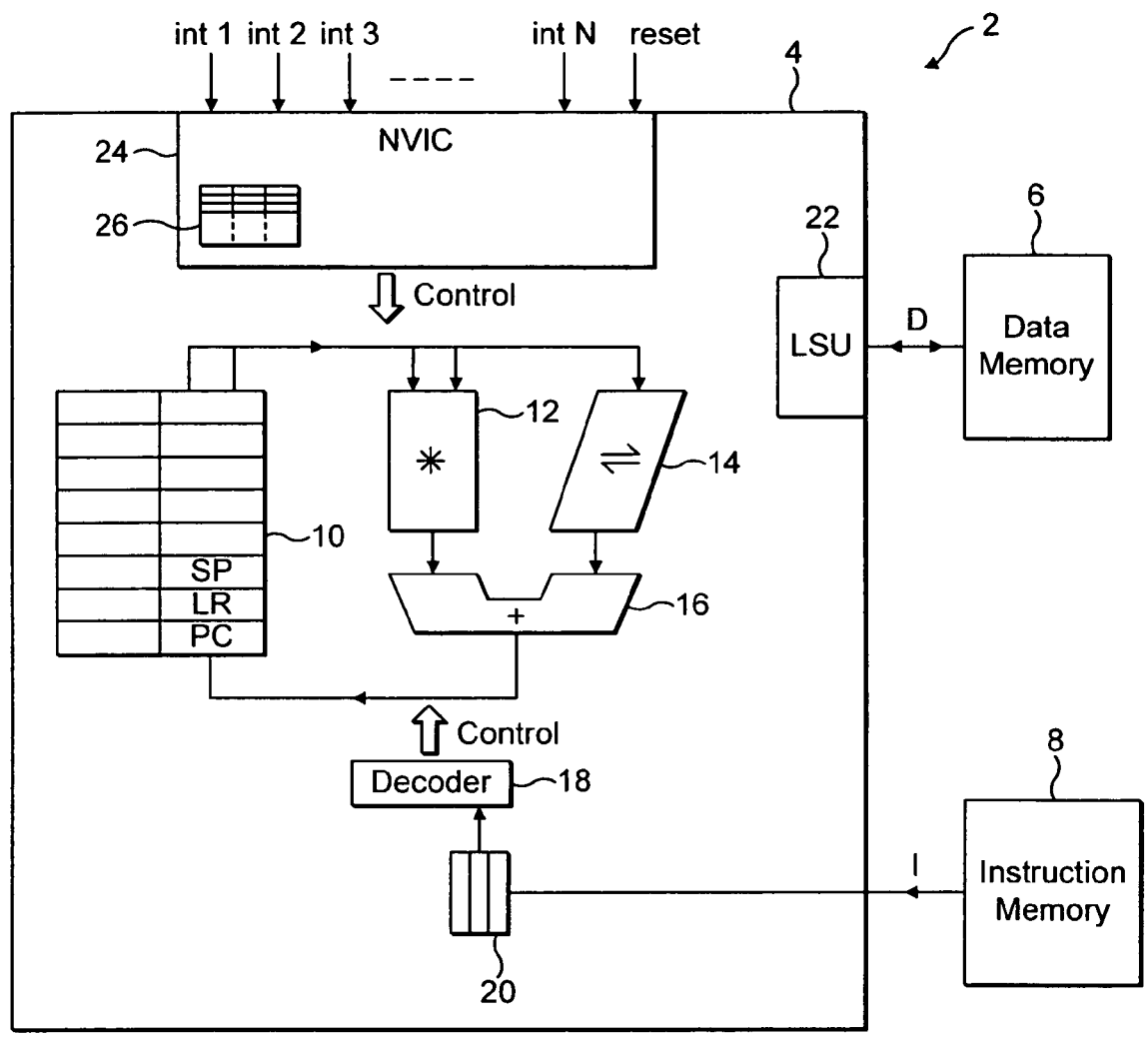
FIG. 1 schematically illustrates a data processing system including a nested vector interrupt controller.

FIG. 1 schematically illustrates a data processing system 2 including a processor core 4 coupled to a data memory 6 and an instruction memory 8. Within a deeply embedded interrupt driven system, the data memory 6 and the instruction memory 8 may typically be separately provided in the form of RAM and flash memories, respectively.

The processor core 4 includes a register bank 10, a multiplier 12, a shifter 14 and an adder 16 which together forms processing logic operable to perform data processing operations under control of control signals generated by an instruction decoder 18. The instruction decoder 18 is responsive to an instruction pipeline 20, which in the example illustrated is a three stage instruction pipeline with the instruction currently at the execute stage being decoded by the instruction decoder 18 and used to generate appropriate control signals for the processing logic 10, 12, 14 and 16.

A load store unit 22 in the processor core 4 serves to handle the reading and writing of data values to and from the data memory 6. Such a load store unit 22 can include a write buffer and a wide read buffer as appropriate.

The processor core 4 also includes a nested vector interrupt controller 24 which is responsive to N separate interrupt signals as well as an external reset signal. The nested vector interrupt controller 24 may also be subject to internal interrupt-type signals, such as fault and abort signals. A separate non-maskable interrupt signal (not illustrated) may also be supplied to the nested vector interrupt controller. The nested vector interrupt controller 24 is responsive to the received interrupt signals to generate control signals, as will be described further below, which serve to control interrupt processing by the processor core 4. In particular, a received interrupt signal may or may not pre-empt existing user program type processing or existing interrupt processing depending upon a priority level value associated with that interrupt. A control table 26 is provided within the nested vector interrupt controller 24 and serves to track which interrupts are pending and which are active and to store programmable priority level values.

Figure 2:
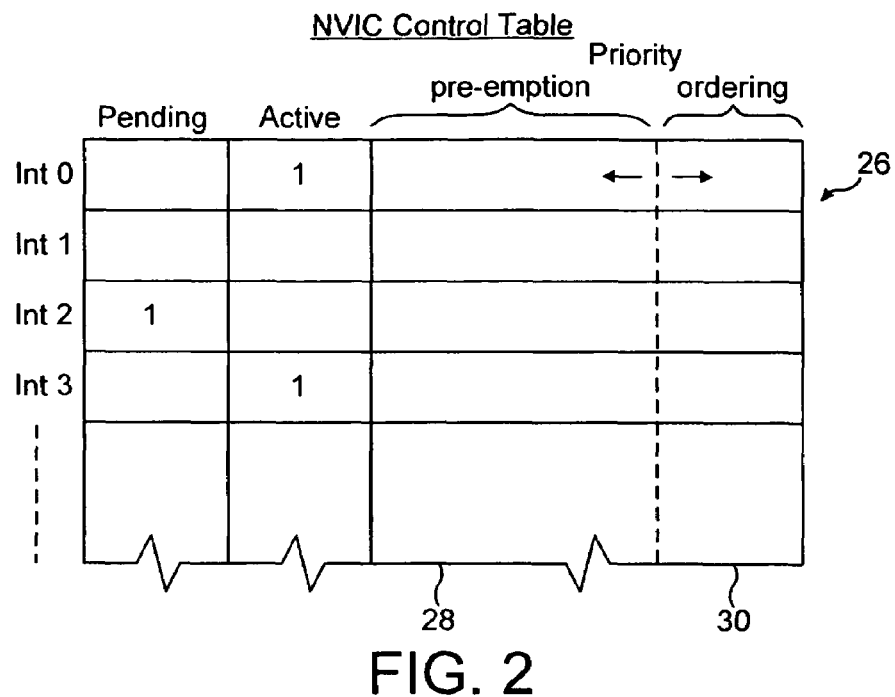
FIG. 2 schematically illustrates a control table used within a nested vector interrupt controller.

FIG. 2 schematically illustrates the control table 26 of the nested vector interrupt controller 24. For each interrupt signal there is recorded respective status flags indicating whether an interrupt is pending or is currently active for that interrupt signal. A pending interrupt is one where the interrupt signal has been detected by the nested vector interrupt controller 24 but has not yet been actioned, i.e. the associated interrupt handling program has not yet started execution. An active interrupt is one in which the interrupt handling program has started execution, although it may not be currently executing as it may itself have been pre-empted by a higher priority interrupt.

In the example illustrated, it will be seen that currently interrupts Int0 and Int3 are active. Only one of these will currently be executing with the other having been pre-empted. The currently executing interrupt handling program will only have been able to pre-empt the earlier activated interrupt handling program if it has a higher priority. The interrupt Int2 is pending, but not yet activated. This implies that the interrupt Int2 has a lower or equal priority to the interrupt handling programs which are currently executing and so is not able to pre-empt these existing active interrupt handling programs.

FIG. 2 shows that the priority level value associated with each interrupt is separated into a first portion 28 and a second portion 30. It will be appreciated that this is a preferred feature and not all embodiments of the present techniques need use this feature, e.g. a simple single unified priority value may be used. The boundary between these two portions is variable for the system as a whole. The splitting between the two portions may be effectively performed by a programmable mask value. The first portion 28 is a pre-emption grouping value, which serves to control which interrupts pre-empt other interrupts. Interrupts sharing a common first portion 28 will not pre-empt each other. Interrupts having a first portion 28 corresponding to a higher priority than the existing active interrupt will pre-empt that existing active interrupt when they become pending. Conversely, if the first portion of a pending interrupt is lower than the first portion of the currently active interrupt, then it will not pre-empt and will not start execution until that high priority active interrupt has completed its processing.

The second portion 30 of the priority level value serves to control the relative ordering of execution within interrupts from a common pre-emption group. This has effect when more than one interrupt from the same pre-emption group is pending. In this case, the order of execution of these interrupts from the same pre-emption group is controlled by which has the highest priority indicated by the second portion 30. This splitting of the priority level value into a first portion 28 which controls pre-emption and a second portion 30 which controls relative ordering within pre-emption groups, provides a fine grained and sophisticated level of control of the pre-emption behaviour. A particular interrupt may not have a high enough priority to justify the penalty associated with pre-emption in terms of state saving and restoring, but nevertheless be sufficiently high priority to be executed ahead of existing other pending interrupts from its same pre-emption group.

The priority level values stored within the control table 26 may be dynamically altered under program control. The control table 26 may for example be memory mapped and written to by appropriate software controlled writes to specific memory locations.

As illustrated in FIG. 2, the first portion 28 and the second portion 30 are contiguous and abut within the priority level value for a given interrupt. In the particular example illustrated, the priority level value is a 4-bit value with 3-bits devoted to the first portion 28 and 1-bit devoted to the second portion 30. This arrangement would provide eight levels of pre-emption grouping and two levels of relative ordering within pre-emption groups. Interrupts having completely identical priority level values may be processed in their interrupt number order or the order in which they arose.

As previously mentioned, the division between the first portion 28 and the second portion 30 may be programmably set to provide different levels of granularity at the pre-emption group level and the ordering level. At one extreme, it is possible that only a single pre-emption group is provided with all 4-bits of the priority level value being dedicated to specifying a relative ordering within the interrupts, none of which are able to pre-empt one another.

Figure 3:
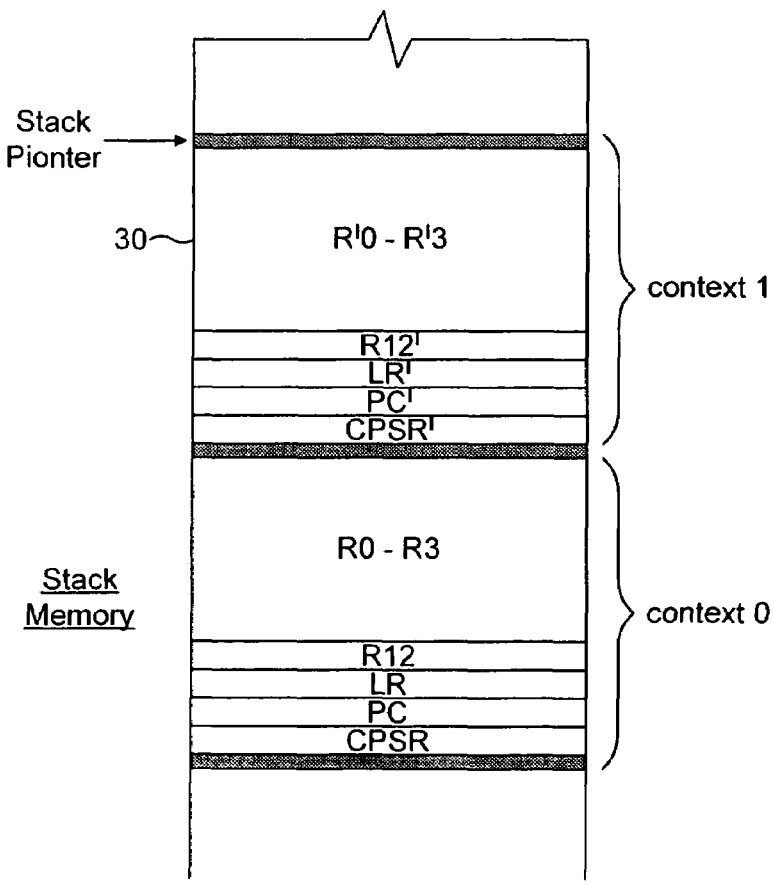
FIG. 3 schematically illustrates a stack memory containing multiple sets of state data.

FIG. 3 schematically illustrates a stack data store in the form of a stack memory 30 which is a region within the data memory 6. In accord with the normal way of controlling a stack memory 30, a stack pointer value is maintained indicating a top-of-stack position from which data may be read and to which data may be written. As context/state data needs to be saved, it is written to the stack memory 30 in a predetermined order. In the example illustrated, the state data saved includes a processor status register value CPSR, a program counter value PC, a link register value LR, a scratch register value R12 and four general purpose processing register values R0-R3. As interrupts are nested and accordingly multiple levels of context data need to be saved, then further contexts are saved to the stack memory 30. In the example of FIG. 3, the first state data saved related to context 0. The interrupt which triggered this state data relating to context 0 to be saved was then itself pre-empted and resulted in state data corresponding to context 1 of the partially completed interrupt handling program to be saved to the stack memory 30. In this way, state data can be wound onto and wound off the stack memory 30 as the degree of nesting increases and decreases among the interrupts. It is normal for software to be responsible for saving register values, such as a R12 and R0-R3. Having hardware perform this save increases the processing savings associated with the tail chaining technique. Furthermore, the software for the interrupt processing is rendered closer to normal software as opposed to special interrupt handling software.

Figure 4:
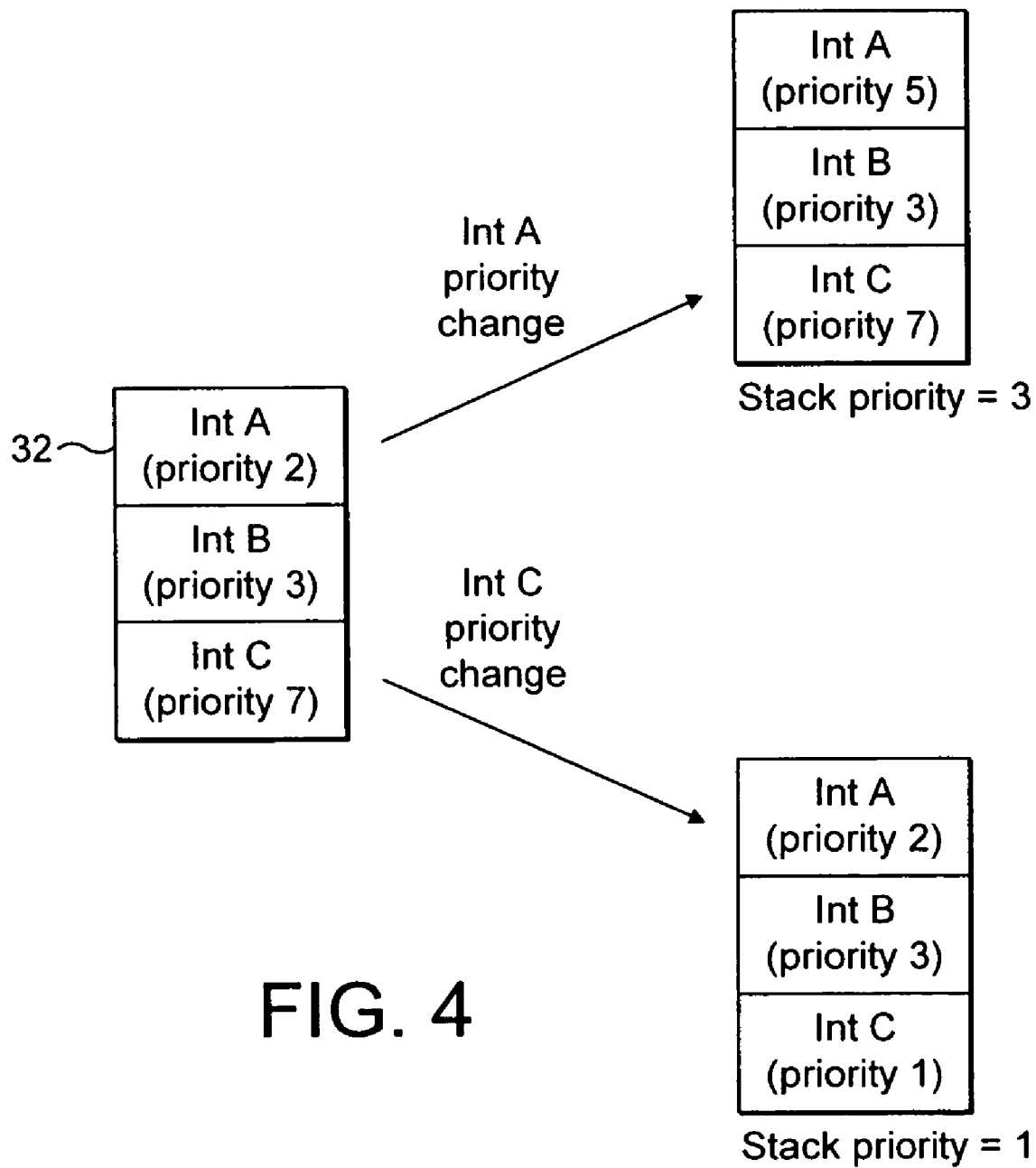
FIG. 4 schematically illustrates two example situations in which priority inversions can arise within nested interrupts.

FIG. 4 schematically illustrates a problem associated with the programmability of the priority level values of FIG. 2. FIG. 4 illustrates a portion of stack memory 32 in which a currently executing active interrupt handling program corresponding to interrupt IntA is executing with nested interrupts beneath it corresponding to interrupts IntB and IntC. As these interrupts have successfully pre-empted one another there is the expected monotonic increase in priority level value associated with the interrupts as one proceeds up the nesting hierarchy. The currently executing active interrupt IntA has the highest priority, namely a priority level value 2.

Illustrated in FIG. 4 are two possible ways in which the priority level values associated with the interrupts currently active may be altered that results in an inappropriate priority inversion within the stack memory 32. In the upper example, the interrupt IntA has its priority level value lowered, such that it is now of a lower priority than the interrupt IntB which it itself pre-empted. This can cause a problem in that should a further interrupt now arise which has a higher priority than interrupt IntA, but a lower priority than interrupt IntB, this may pre-empt the currently executing interrupt IntA in an inappropriate way and disadvantageously delay completion of interrupt IntB. In order to avoid this problem, the nested vector interrupt controller 24, using the priority values stored within the control table 26, determines a priority value corresponding to all of the interrupts currently held within the stack memory, and more particularly the highest of these priority values. Thus, in the upper example discussed above, even though the active interrupt currently executing, namely IntA, has a priority value of 5, the stack will be treated as having a priority value of 3 and accordingly no newly detected interrupt will pre-empt the continuing execution of IntA, and consequently delay execution of IntB, unless it has a higher priority than 3. This ensures that the interrupt processing associated with IntB is not inappropriately delayed.

The lower example in FIG. 4 illustrates how the priority value associated with interrupt IntC can be raised whilst that interrupt has already been pre-empted and is buried within the nested interrupts on the stack. In accordance with the present technique this change in this buried interrupt IntC is reflected in the overall priority level value associated with the stack and accordingly no further pre-emptions will be allowed until the interrupt IntC has been cleared, unless those newly arising interrupts have a priority level value higher than that associated with interrupt IntC.

In the case of a pending interrupt arising with a priority level equal to the highest priority level associated with the stack of currently active interrupt handling programs, then this will not pre-empt.

The examples illustrated in FIG. 4 relate to the prevention of inappropriate pre-emption. It is also possible that the priority levels may be altered such that an interrupt which is currently pending and was being held off from being made active is, as a result of a lower of the priority level of the stack as a whole, made suitable to trigger a pre-emption. Such a pending interrupt may be a newly detected interrupt or a previously detected but as yet not started interrupt.

It will be appreciated that not all embodiments need use the technique whereby the priority level of the stack as a whole is compared with that of potentially pre-empting interrupt to determine if a pre-emption should take place.

The alteration of the priority level values discussed above may be made as a way of controlling the amount of memory space consumed by the stack memory 30. As the stack memory resources are used up, priority levels associated with the nested active interrupts can be increased to tend to prevent further pre-emption which would require further stack memory resources. In this way, a stack overflow may be avoided. A particularly preferred control method may serve to hold the amount of stack memory used to three quarters of its capacity by promoting the priority levels associated with active interrupts. Leaving one quarter of the stack memory available for additional pre-emption ensures that interrupt handling programs of the highest priority are able to pre-empt as space will be available on the stack memory.

Figure 5:
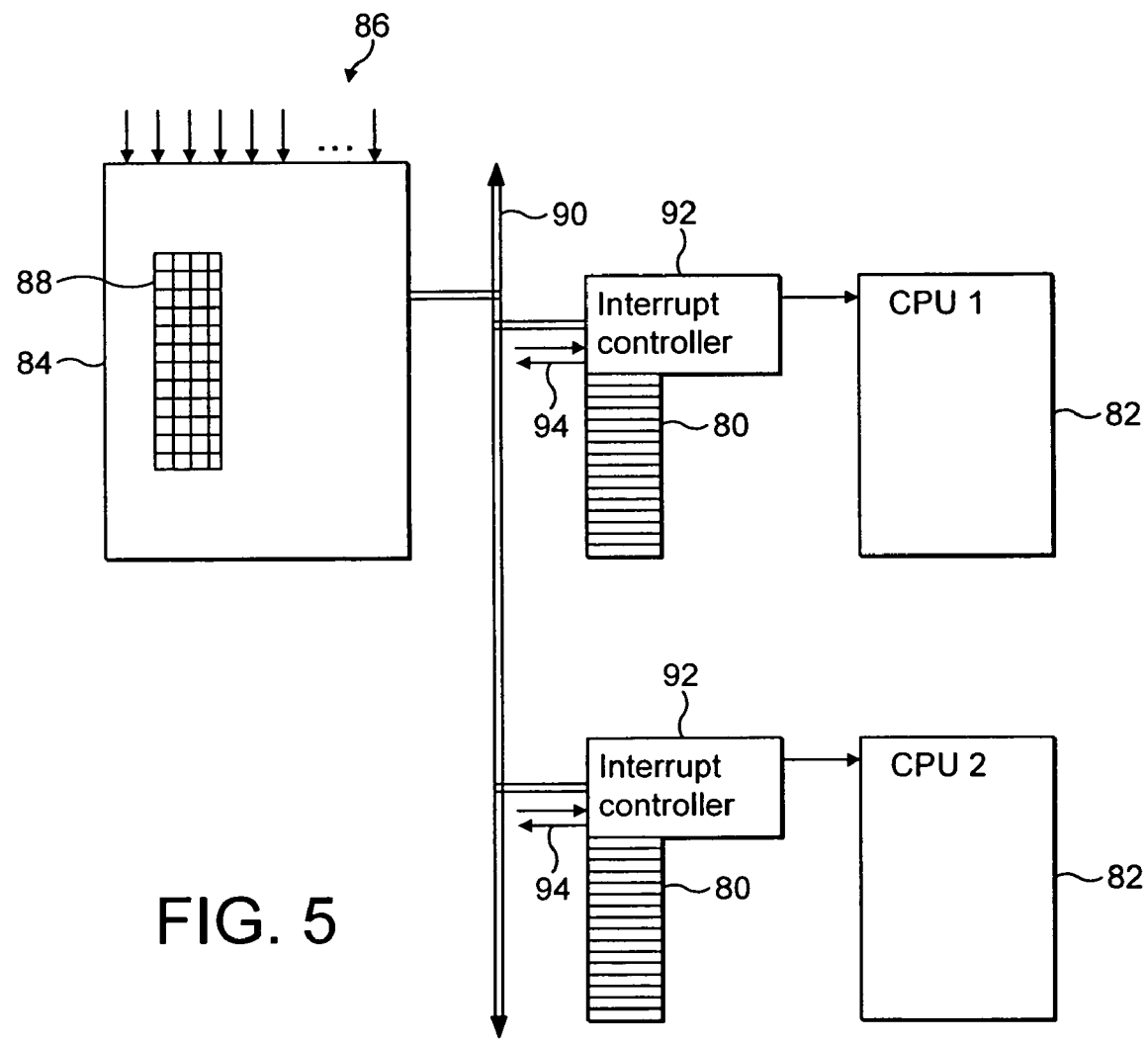
FIG. 5 schematically illustrates a multiprocessor system employing some of the present techniques.

The technique of promoting priority level values may also be employed within a multiprocessor system, as schematically illustrated in FIG. 5, in which a hardware stack of active interrupts 80 is provided for each processor 82. An interrupt distributor 84 is responsive to an array of interrupt signals 86 which can pend one another in accordance with a priority hierarchy programmed within a table 88. The table 88 stores data for each interrupt indicating a priority level and to which processor(s) 82 it may be issued. The interrupt distributor 84 communicates via a distribution bus 90 with interrupt controllers 92 associated with each processor 82. The interrupt controllers 92 pass signals 94 to the interrupt distributor 84 indicating their current highest priority active interrupt. In this environment, should a hardware stack 80 become full or nearly full, then the priority level values of the interrupts represented within that stack may be effectively increased so as to prevent further pre-emption and an overflow of the hardware stack resources which are provided. This boost of the priority level is communicated by the signal(s) 94.

Figure 6:
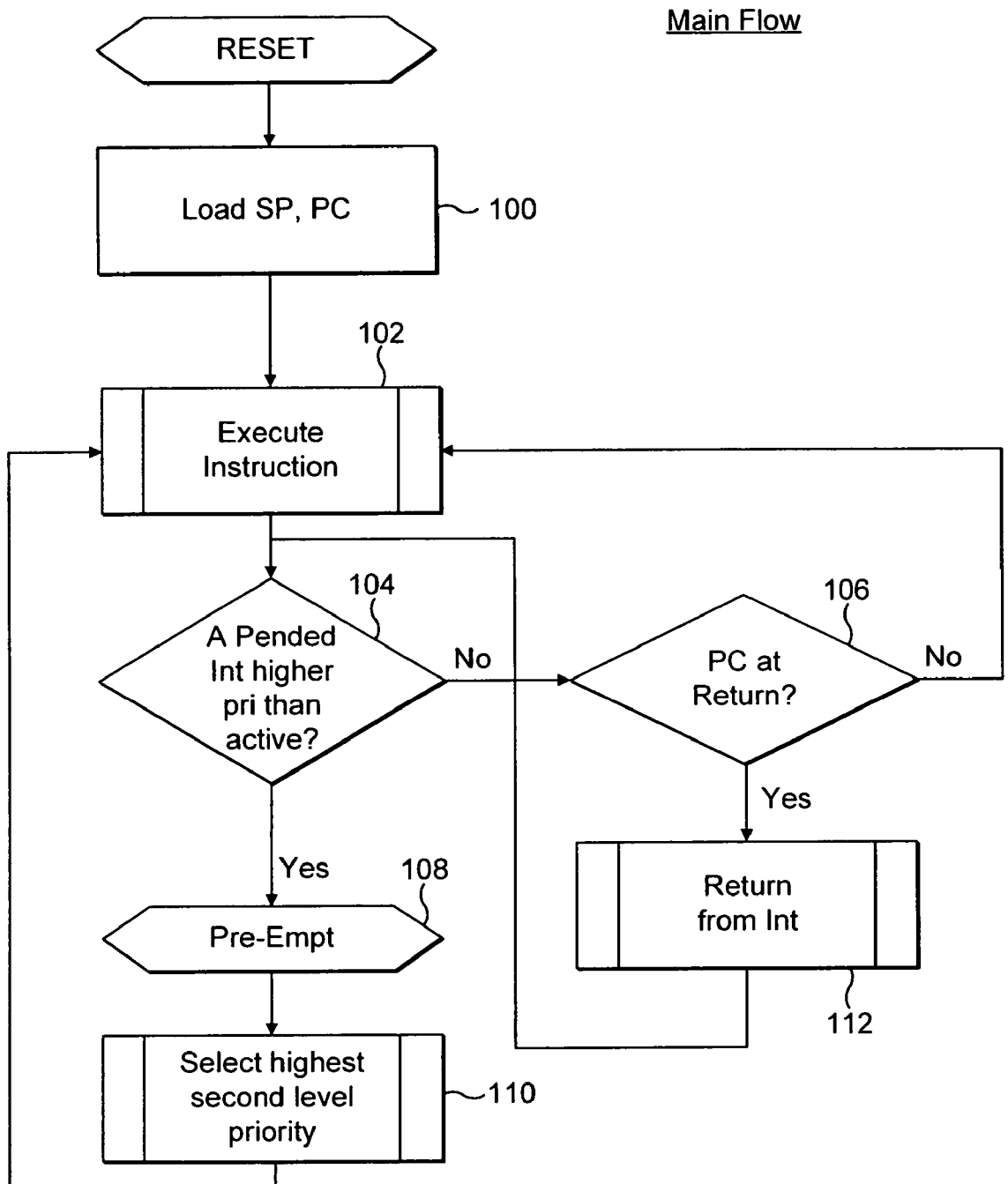
FIG. 6 is a flow diagram schematically illustrating the main control flow for interrupt driven processing within the system of FIG. 1.

FIG. 6 schematically illustrates the main interrupt control flow. When the system emerges from reset, a reset-handling hardware controls reset processing at step 100. Upon exit from the reset handling, a normal user program is started and execution of instructions proceeds at step 102. During this instruction execution, step 104 serves to detect whether there are any pending interrupts that have been detected by the nested vector interrupt controller 24 and marked as pending within the control table 26 that have a higher priority than any existing interrupt processing which is taking place. If no such pending interrupts with a higher priority are present, then processing proceeds to step 106 at which a check is made to see if the program counter value is at a return address corresponding to a predetermined special purpose return address, such as a top of memory location. If such a return address is not detected, then processing returns to step 102 for execution of the next instruction. Alternatively, a special return from interrupt instruction could be placed at the end of the interrupt handling program.

If the determination at step 104 was that there is a pending interrupt with a higher priority than the current processing, whether that be an interrupt itself or the user processing, then step 108 serves to trigger a pre-emption operation as will be described further below and including the step at 110 of selecting the interrupt having the highest second portion 30 of its priority value, if there is more than one pending interrupt which have equal first portions 28 of their priority value and have both a sufficiently high priority value to have triggered the pre-emption. Step 102 then serves to execute the first instruction of the newly activated interrupt.

If the determination at step 106 was that the program counter had the predetermined address value indicating an end of interrupt processing, then step 112 serves to perform a return from interrupt operation as will be described further below before processing is returned to step 104.

Figure 7:
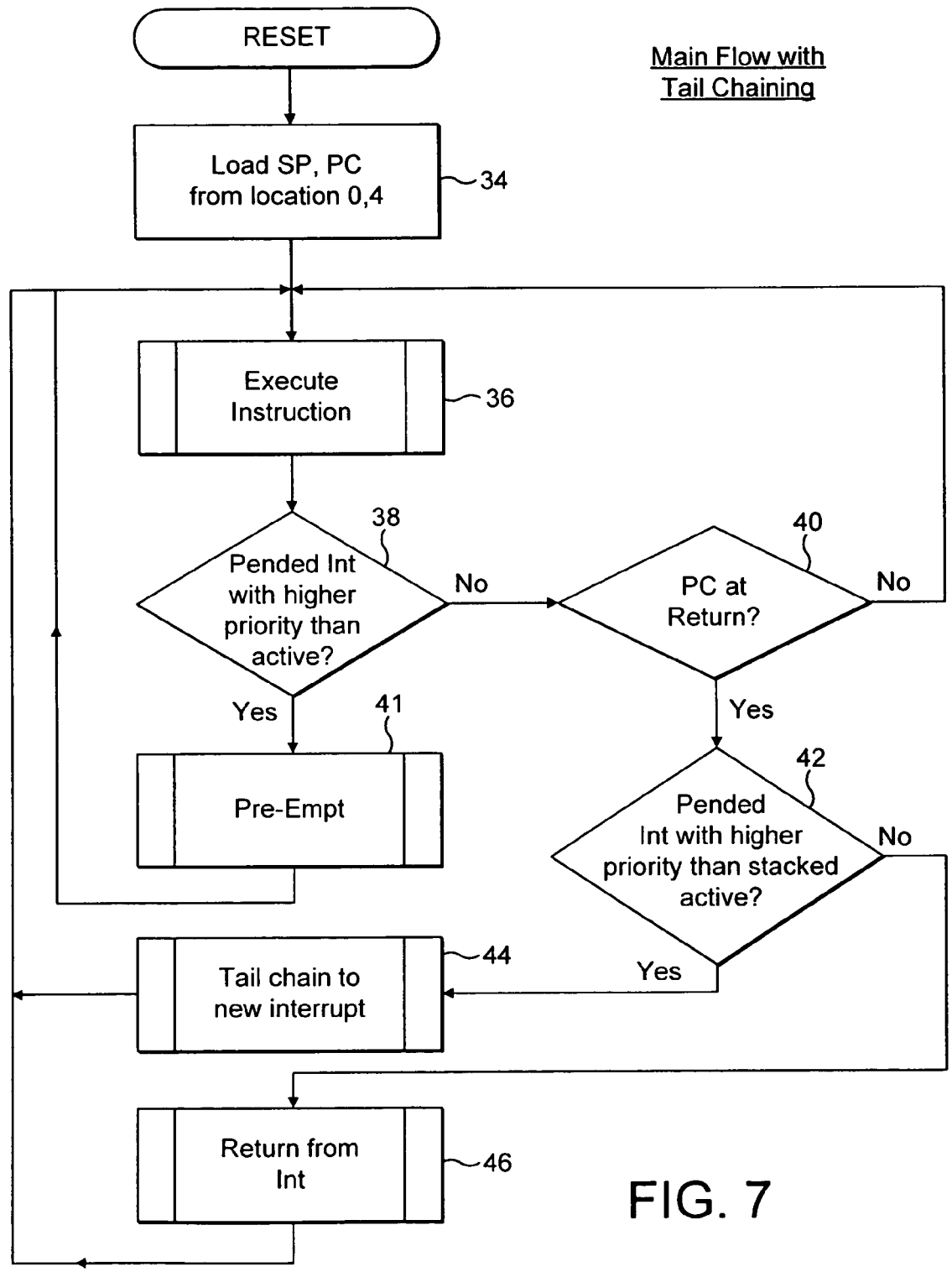
FIG. 7 is a flow diagram schematically illustrating an alternative main control flow for interrupt driven processing within the system of FIG. 1 (not including an illustration of the handling of a late arriving interrupt)

FIG. 7 schematically illustrates the flow of the main interrupt control when tail chaining is supported as described below. When the system emerges from reset, reset handling hardware controls reset processing at step 34. Upon exit from the reset handling, a normal user program is started and execution of instructions proceeds at step 36. During this instruction execution, step 38 serves to detect whether there are any pending interrupts that have been detected by the nested vector interrupt controller 24 and marked as pending within the control table 26 that have a higher priority than any existing interrupt processing which is taking place. If no such pended interrupts with a higher priority are present, then processing proceeds to step 40 at which a check is made to see if the program counter value is at a return address corresponding to a predetermined special purpose return address, such as a top of memory location. If such a return address is not detected, then processing returns to step 36 for execution of the next instruction. Alternatively, a special return from interrupt instruction could be placed at the end of the interrupt handling program.

If the determination at step 38 was that there is a pending interrupt with a higher priority than the current processing, whether that be an interrupt itself or the user processing, then step 41 serves to trigger a pre-emption operation as will be described further below. After this pre-emption operation, processing returns to step 36 where the first instruction within the interrupt handling program which has caused the pre-emption is executed.

If the determination at step 40 was that the program counter had the predetermined return address value indicating an end of interrupt processing, then step 42 serves to detect whether there is a pending interrupt with a higher priority value then the currently stacked active interrupts or user processing. If such a pending interrupt is present, then processing proceeds to step 44 in which a tail chaining operation to that pending interrupt is performed without a save operation as will be discussed further later. After this tail chaining operation at step 44, a return is made to step 36 at which the first instruction in the newly activated interrupt will be executed.

If the determination at step 42 was that there was no pending interrupt with a higher priority than the processing which is stacked and active, then step 46 serves to perform a return from interrupt operation as will be described further below before processing is returned to step 36 where that pre-empted processing is resumed.

Figure 8:
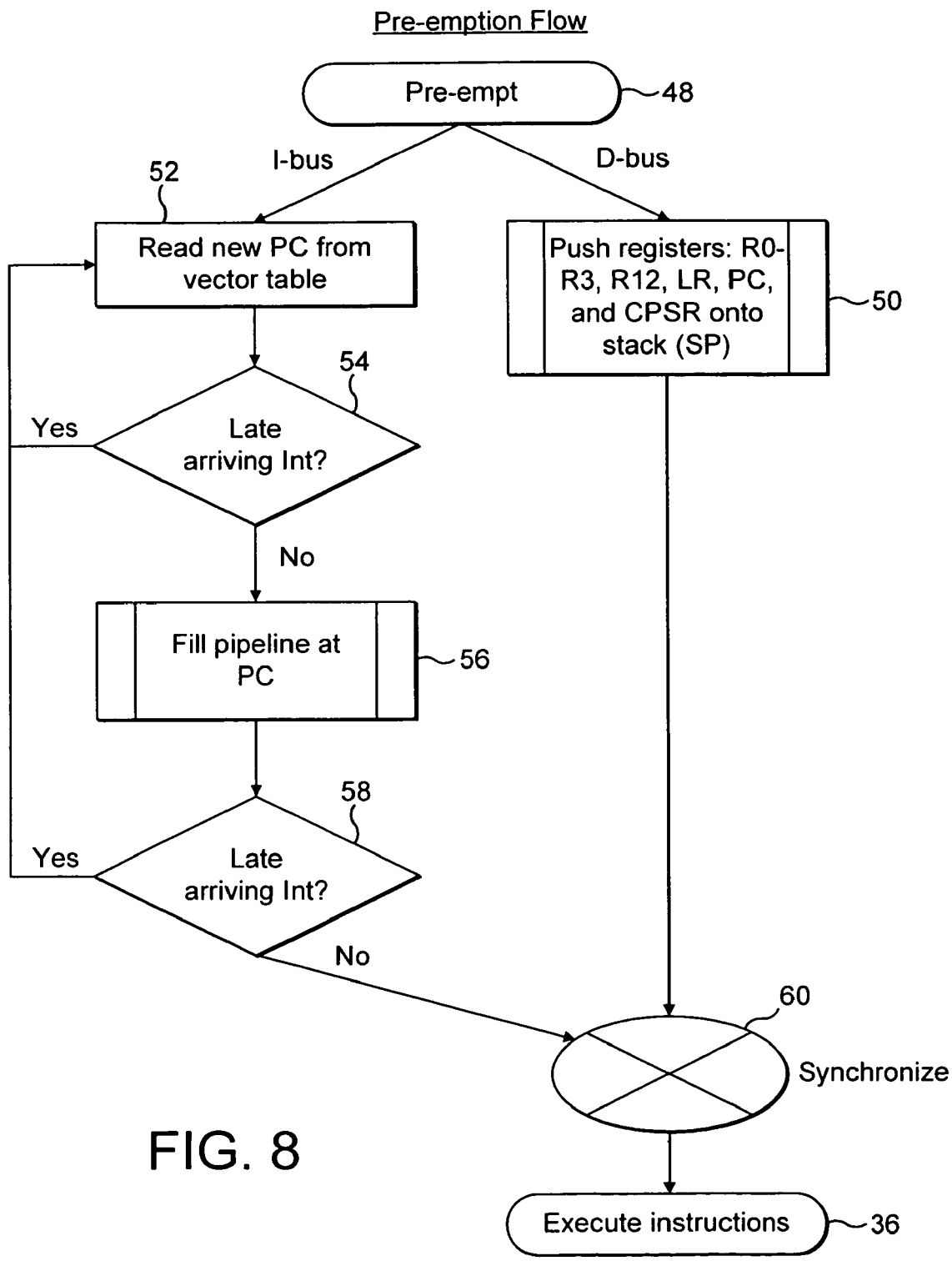
FIG. 8 is a flow diagram schematically illustrating pre-emption flow control.

FIG. 8 schematically illustrates the processing performed during pre-emption. When pre-emption is started at step 48, parallel instruction side and data side hardware controlled operations are initiated. On the data side, the state data to be stored is pushed to the stack memory 30 at step 50. This pushing of the various register values takes a number of processing cycles to complete. In parallel with the data side operations, the instruction side serves at step 52 to read a new program counter value for the target interrupt handling program from the vector table of the processor associated with the interrupt which has triggered the pre-emption. Step 54 then serves to check for any late arriving interrupt signal generated by the nested vector interrupt 24 indicating that a new interrupt event has been detected which has a higher priority than the interrupt event which triggered the initial pre-emption started at step 48. If such a late arriving interrupt signal is detected, then processing is returned to step 52, where the new program counter value associated with the late arriving interrupt is read from the vector table such that the appropriate interrupt handling code can start to be read from the memory and be fed to the instruction pipeline 20. If there is no late arriving interrupt signal detected at step 54, then step 56 serves to start to fill the instruction pipeline 20 with the interrupt handling code. When this interrupt handling code has been loaded into the pipeline, then a further step at step 58 is made to determine again whether any late arriving interrupt signal has occurred and if so to return to step 52 such that the late arriving interrupt can be serviced. It will be appreciated that the check for the late arriving interrupt is illustrated in FIG. 6 as occurring at steps 54 and 58 surrounding the pipeline filling step 56, but in practice the late arriving interrupt check may be continuously performed in parallel with the pipeline filling operation.

When both the instruction side pipeline filling and the data side state data storage have completed (as shown with a synchroniser at step 60), processing then proceeds to execute instructions at step 36 as shown. This parallel operation increases speed and allows for late arriving interrupts to be accommodated by restarting the pipeline refill.

Figure 9:
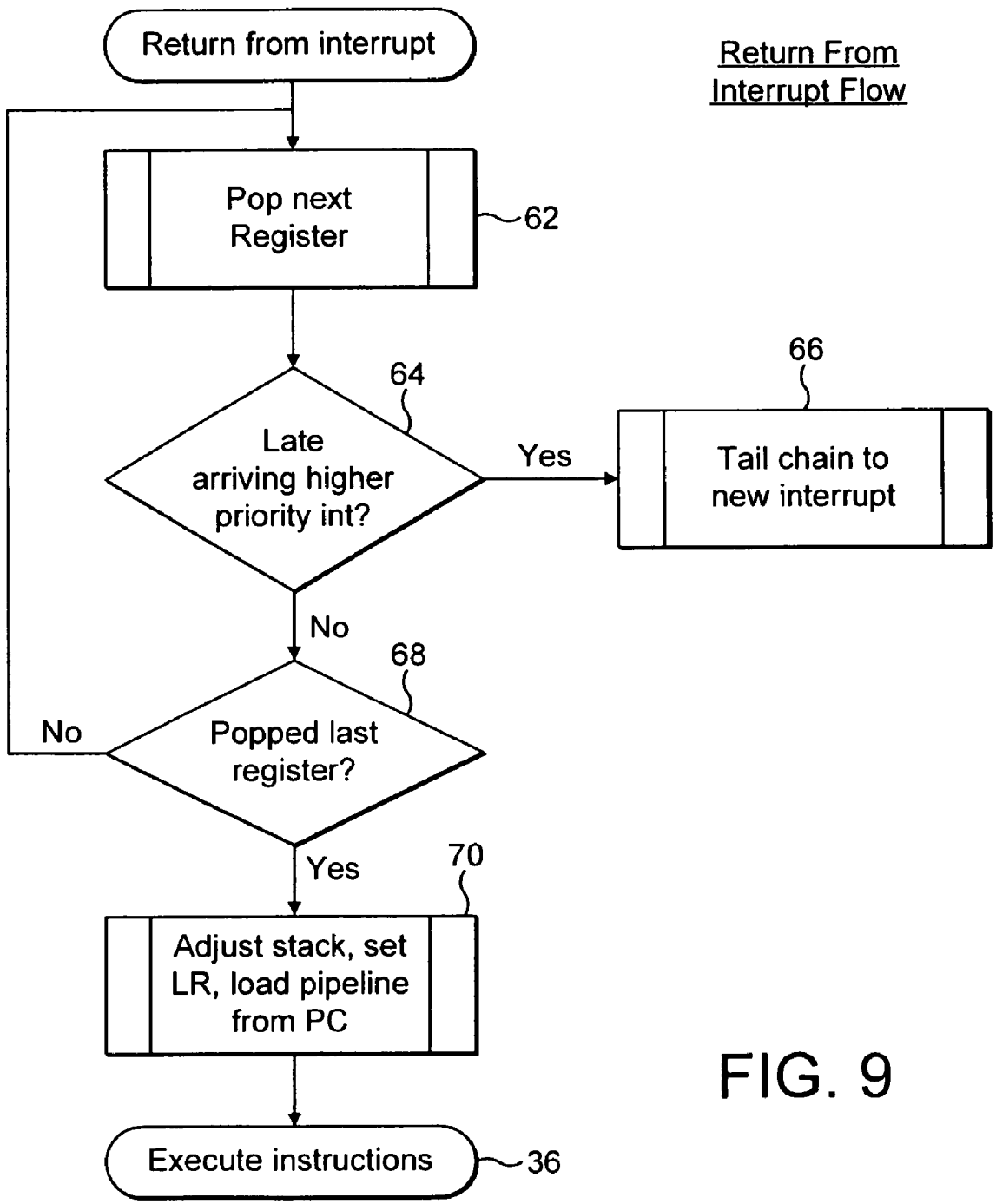
FIG. 9 is a flow diagram schematically illustrating return from interrupt flow control.

FIG. 9 schematically illustrates a return from interrupt processing flow. When the return from interrupt has been initiated, the nested vector interrupt controller 24 acts at step 62 to retrieve the state data from the stack memory 30. At step 64 a check is made for a late arriving interrupt with a higher priority than the interrupt or processing to which a return is being made. If such a high priority interrupt is detected, then a tail chaining operation is initiated at step 66 and any appropriate repairs necessary to the saved data on the stack memory 30, stack pointer or restored registers are made.

If no late arriving higher priority interrupt is detected at step 64, then step 68 serves to detect the restoring of the last of the state data for the interrupt or processing being returned to and when this is complete, processing is passed to step 70 where the stack pointer is adjusted and the link register and pipeline are reloaded before execution of instructions is resumed at step 36.

If the system is an interrupt-only system, then return from interrupt when there are no pending interrupts can be used by the hardware to trigger entry into a low power consumption sleep mode in which processing is halted awaiting detection of the next interrupt event.

Figure 10:
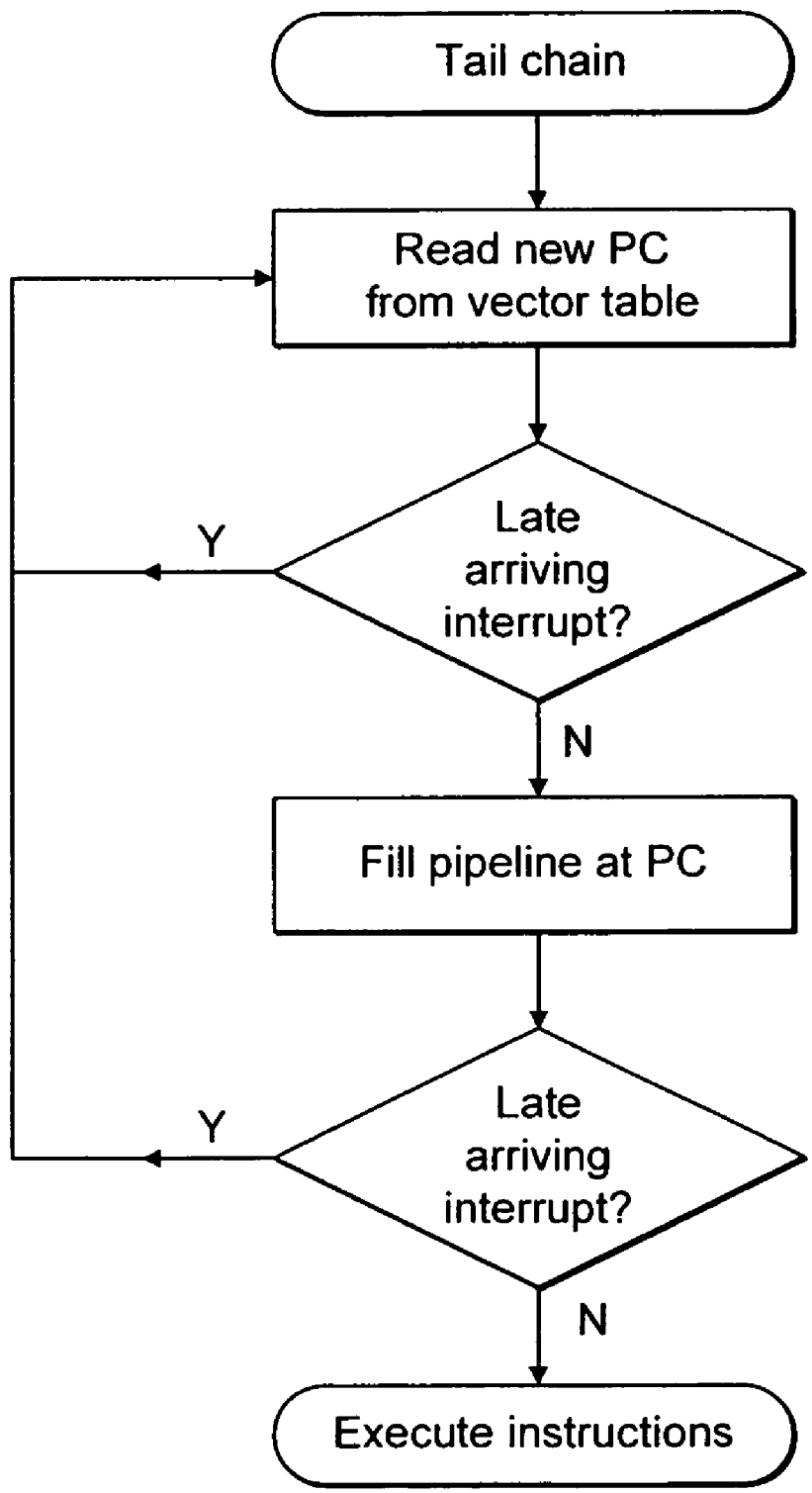
FIG. 10 is a flow diagram schematically illustrating flow control when processing of one interrupt directly follows processing of another interrupt.

FIG. 10 schematically illustrates the tail chaining processing flow. This processing flow is the same as that illustrated in FIG. 6, except that in this example there is no need to save the state data at step 50 since tail chaining occurs when one interrupt handling program has completed and another is to be started without a return to any previous state being made. Accordingly, there is no state associated with the terminating interrupt handling program that needs to be saved. The time taken to save state data upon entering an interrupt is normally a limiting factor since the reloading of the instruction pipeline 20 with the interrupt handling code to be executed is normally quicker. Thus, the tail chaining technique can speed interrupt response in circumstances where one episode of interrupt handling immediately follows another.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:

a processor configured to perform processing operations under control of program instructions;

a stack data store configured to store one or more sets of state data, each set associated with a respective processing performed by said processor when an interrupt event occurs, each said interrupt event is associated with a priority that is programmable both before and after said interrupt event occurs; and an interrupt controller, in response to a first interrupt event, for storing to said stack data store first state data associated with processing being performed when said first interrupt event occurred and for redirecting program instruction execution to a first interrupt handling program and, upon completion of said first interrupt handling program, for detecting if one or more second interrupt events having a higher priority than said processing that was interrupted by said first interrupt event has occurred during execution of said first interrupt handling program and (i) if said one or more second interrupt events has occurred, then redirecting program instruction execution to a second interrupt handling program without saving further state data to said stack data store; and (ii) if said one or more second interrupt event has not occurred, then reloading said first state data from said stack data store and resuming said processing that was interrupted by said first interrupt event, wherein when said stack data store is storing a plurality of sets of state data, each set associated with a respective one of a plurality of interrupt events, said interrupt controller is further configured to determine a stack priority level corresponding to the highest priority interrupt event among said plurality of interrupt events associated with said plurality of sets of state data stored in said stack data store; and said interrupt controller is further configured to detect that said one or more second interrupt events have a higher priority than said processing that was interrupted by said first interrupt event if said one or more second interrupt event has a higher priority than said stack priority level.

2. Apparatus as claimed in claim 1, wherein said first state data includes one or more of:
a program counter value corresponding to a current program execution point;
a processor status register value corresponding to one or more state variables of said apparatus; and
one or more data processing register values corresponding to data values held within at least some general purpose data processing registers of said apparatus.

3. Apparatus as claimed in claim 1, wherein said processing being performed when said first interrupt event occurred was one of:
execution of a non-interrupt triggered program; and
execution of an active interrupt handling program, said interrupt controller being a nested interrupt controller permitting a pending interrupt handling program to preempt said active interrupt handling program if said active interrupt handling program has a lower priority than said pending interrupt handling program.

4. Apparatus as claimed in claim 1, wherein said first interrupt event and said one or more second interrupt events each have respective priority values, said interrupt controller being operable to compare said respective priority values to determine if any of said one or second interrupts event has a higher priority than said first interrupt event and if so to pre-empt execution of said first interrupt handling program with execution of said a second interrupt handling program.

5. Apparatus as claimed in claim 1, wherein said interrupt controller is responsive to a late interrupt signal during reloading of said first state data to abort a return to said processing being performed when said first interrupt event occurred and instead redirect execution to an interrupt handling program associated with said late interrupt signal.

6. Apparatus as claimed in claim 1, wherein if such a said second interrupt event has occurred, then redirection of program instruction execution to said second interrupt handling program occurs without reloading said first state data from said stack data store.

7. Apparatus as claimed in claim 5, wherein upon aborting said return, said stack data store is repaired to undo any alterations made by partial completion of said return.

8. Apparatus as claimed in claim 7, wherein said repair includes repairing one or more of stack pointer data and link register data.

9. Apparatus as claimed in claim 1, wherein transfer of data values to said stack data store under control of said interrupt controller is performed in parallel with and asynchronously to loading of program counter location and program instructions into an instruction pipeline prior to execution.

10. Apparatus as claimed in claim 1, wherein said interrupt controller is responsive to execution of a return instruction with a predetermined link address value loaded within a link register to perform a return from interrupt operation.

11. Apparatus as claimed in claim 1, wherein said stack data store is a stack memory.

12. Apparatus as claimed in claim 1, wherein when there are no pending interrupts said apparatus enters a low power mode in which processing is halted awaiting an interrupt event.

13. A method of processing data, said method comprising the steps of:
performing processing operations under control of program instructions;
storing to a stack data store one or more sets of state data, each set associated with a respective processing performed when an interrupt event occurs, each said interrupt events is associated with a priority that is programmable both before and after said interrupt event occurs; and
in response to a first interrupt event, storing to said stack data store first state data associated with processing being performed when said first interrupt event occurred and to redirect program instruction execution to a first interrupt handling program, wherein upon completion of said first interrupt handling program, detecting if a second interrupt event having a higher priority than said processing that was interrupted by said first interrupt event has occurred during execution of said first interrupt handling program and
(i) if said second interrupt event has occurred, then redirecting program instruction execution to a second interrupt handling program without saving further state data to said stack data store; and
(ii) if said second interrupt event has not occurred, then reloading said first state data from said stack data store and resuming said processing that was interrupted by said first interrupt event, wherein when said stack data store is storing a plurality of sets of state data, each set associated with a respective one of a plurality of interrupt events, said detecting step includes a step of determining a stack priority level corresponding to the highest priority interrupt event among said plurality of interrupt events associated with said plurality of sets of state data stored in said stack data store; and
said detecting step detects that said one or more second interrupt events have a higher priority than said processing that was interrupted by said first interrupt event if said one or more second interrupt event has a higher priority than said stack priority level.

14. A method as claimed in claim 13, wherein said first state data includes one or more of:
a program counter value corresponding to a current program execution point;
a processor status register value corresponding to one or more state variables of an apparatus perform said method; and
one or more data processing register values corresponding to data values held within at least some general purpose data processing registers of said apparatus.

15. A method as claimed in claim 13, wherein said processing being performed when said first interrupt event occurred was one of:
execution of a non-interrupt triggered program; and execution of an active interrupt handling program, interrupt control being nested interrupt control permitting a pending interrupt handling program to pre-empt said active interrupt handling program if said active interrupt handling program has a lower priority than said pending interrupt handling program.

16. A method as claimed in claim 13, wherein said first interrupt event and said second interrupt event each have respective priority values, said respective priority values being compared to determine if said second interrupt event has a higher priority than said first interrupt event.

17. A method as claimed in claim 13, wherein in response to a late interrupt signal during reloading of said first state data, aborting a return to said processing being performed when said first interrupt event occurred and instead redirecting execution to an interrupt handling program associated with said late interrupt signal.

18. A method as claimed in claim 13, wherein if such a said second interrupt event has occurred, then redirection of program instruction execution to said second interrupt handling program occurs without reloading said first state data from said stack data store.

19. A method as claimed in claim 17, wherein upon aborting said return, said stack data store is repaired to undo any alterations made by partial completion of said return.

20. A method as claimed in claim 19, wherein said repair includes repairing one or more of stack pointer data and link register data.

21. A method as claimed in claim 13, wherein transfer of data values to said stack data store is performed in parallel with and asynchronously to loading of program counter location and program instructions into an instruction pipeline prior to execution.

22. A method as claimed in claim 13, wherein in response to execution of a return instruction with a predetermined link address value loaded within a link register, performing a return from interrupt operation.

23. A method as claimed in claim 13, wherein said stack data store is a stack memory.

24. A method as claimed in claim 13, wherein when there are no pending interrupts a low power state is entered in which processing is halted awaiting an interrupt event.

* * * * *